United States Patent [19]

Gray

[11] Patent Number: 5,549,356
[45] Date of Patent: Aug. 27, 1996

[54] CHILD RESTRAINT SYSTEM

[75] Inventor: Mark F. Gray, Attica, Mich.

[73] Assignee: TRW Vehicle Safety Systems Inc., Lyndhurst, Ohio

[21] Appl. No.: 327,022

[22] Filed: Oct. 21, 1994

[51] Int. Cl.⁶ .................................................. B60N 2/28
[52] U.S. Cl. ...................... 297/256.15; 297/467; 297/484
[58] Field of Search .............................. 297/256.15, 484, 297/467, 256.1

[56] References Cited

U.S. PATENT DOCUMENTS

| | | | |
|---|---|---|---|
| 3,912,328 | 10/1975 | Tanaka | 297/467 |
| 4,040,664 | 8/1977 | Tanaka et al. . | |
| 4,305,618 | 12/1981 | Molnar . | |
| 4,376,551 | 3/1983 | Cone | 297/256.15 X |
| 4,720,148 | 1/1988 | Anthony et al. . | |
| 4,738,489 | 4/1988 | Wise et al. | 297/467 X |
| 4,762,369 | 8/1988 | Nicod | 297/484 |
| 4,770,468 | 9/1988 | Shubin . | |
| 4,858,997 | 8/1989 | Shubin | 297/256.15 X |

FOREIGN PATENT DOCUMENTS

| | | | |
|---|---|---|---|
| 2222251 | 12/1972 | Germany | 297/484 |
| 2929362 | 1/1981 | Germany | 297/484 |

*Primary Examiner*—Peter M. Cuomo
*Assistant Examiner*—David E. Allred
*Attorney, Agent, or Firm*—Tarolli, Sundheim, Covell, Tummino & Szabo

[57] ABSTRACT

A child restraint system (24) includes shoulder belts (26) and 28 which engage the shoulders of a child (12) seated in a vehicle. The shoulder belts (26) and (28) are connected with an abdomen shield (32). A buckle (38) connects the shield (32) with a base (16) of a seat (14). A pair of retractor assemblies (50) and (52) are mounted in the abdomen shield (32) to enable the shoulder belts (26) and (28) to be extended upon movement of the abdomen shield (32) away from the child (12) seated in the vehicle. Upon movement of the abdomen shield (32) toward the child (12) seated in the vehicle, the retractor assemblies (50) and (52) retract the shoulder belts (26) and (28). The retractor assemblies (50) and (52) include spools (60) and (70) upon which the shoulder belts (26) and (28) are wound during retraction of the shoulder belts and unwound during extension of the shoulder belts. Latch pawls (66) and (76) are engageable with ratchet wheels (64) and (74) connected to the spools (60) and (70) to lock the spools against extension of the shoulder belts (26) and (28) when the shield (32) is buckled to the base (16). Unbuckling of the abdomen shield (32) from the base (16) results in the latch pawls (66) and (76) being disengaged from the ratchet wheels (64) and (74) to enable the shoulder belts (26) and (28) to be freely extended. An actuator assembly (82) causes the latch pawls (66) and (76) to be disengaged from the ratchet wheels (64) and (74).

14 Claims, 4 Drawing Sheets

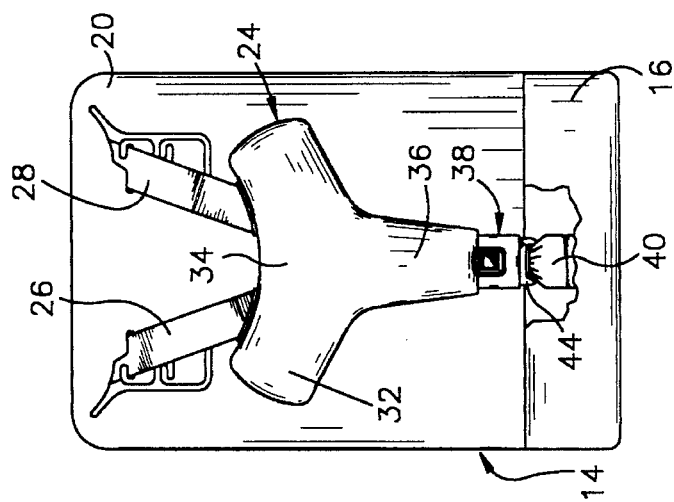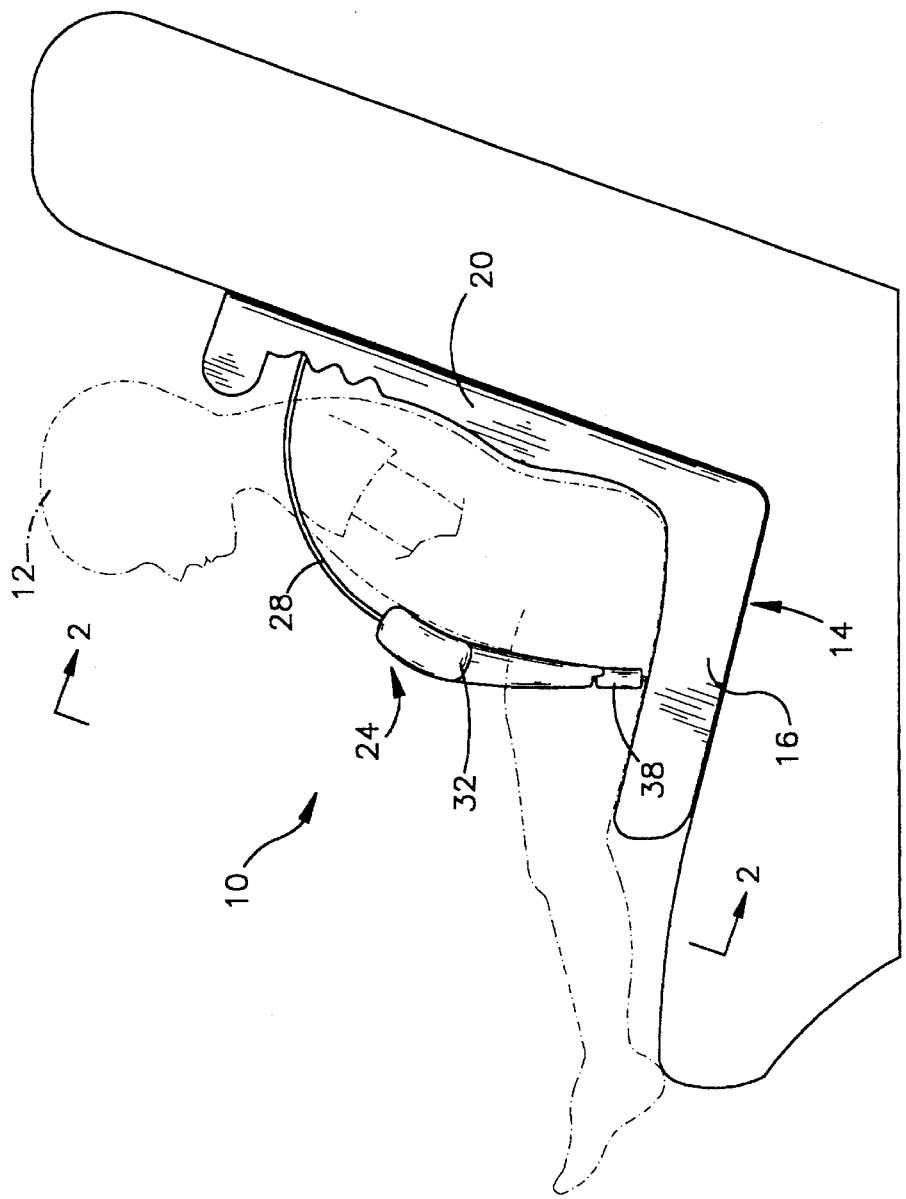

5,549,356

CHILD RESTRAINT SYSTEM

FIELD OF THE INVENTION

The present invention relates to a child restraint system, and more particularly, to a child restraint system having shoulder belts which are connected to an abdomen shield.

BACKGROUND OF THE INVENTION

A known child restraint system is disclosed in U.S. Pat. No. 4,762,369. This child restraint system includes a pair of shoulder belts which are connected with the back of a seat for the child. The shoulder belts are also connected with an abdomen shield. The abdomen shield is connected with a base of the seat by a buckle. An apparatus for adjusting the length of the shoulder belts is disposed within the abdomen shield.

SUMMARY OF THE INVENTION

An improved apparatus for restraining a child seated in a vehicle includes shoulder belts which engage the shoulders of the child and a shield which engages the abdomen of the child. The abdomen shield is connected with a base by a buckle. The shoulder belts are connected with belt retractors mounted on the abdomen shield. Upon movement of the abdomen shield away from the child, the shoulder belts are extended from the retractors. Upon movement of the abdomen shield toward the child, the shoulder belts are retracted by the retractors.

The shoulder belt retractors include spools upon which the shoulder belts are wound during retraction of the shoulder belts and from which the shoulder belts are unwound during extension of the shoulder belts. Latches are operated from a disengaged condition to an engaged condition to block extension of the shoulder belts when the abdomen shield is buckled to the base. Upon unbuckling of the shield from the base, the latches are disengaged to allow the shoulder belts to be extended.

BRIEF DESCRIPTION OF THE DRAWINGS

The above and other features of the present invention will become more apparent to those skilled in the art upon reading the following description of a preferred embodiment of the invention in view of the accompanying drawings, wherein:

FIG. 1 is a schematic side elevational view depicting the relationship of a child restraint system to a vehicle seat;

FIG. 2 is a front elevational view, taken generally along the line 2—2 of FIG. 1, further illustrating the child restraint system;

DESCRIPTION OF A PREFERRED EMBODIMENT

Figure 3:
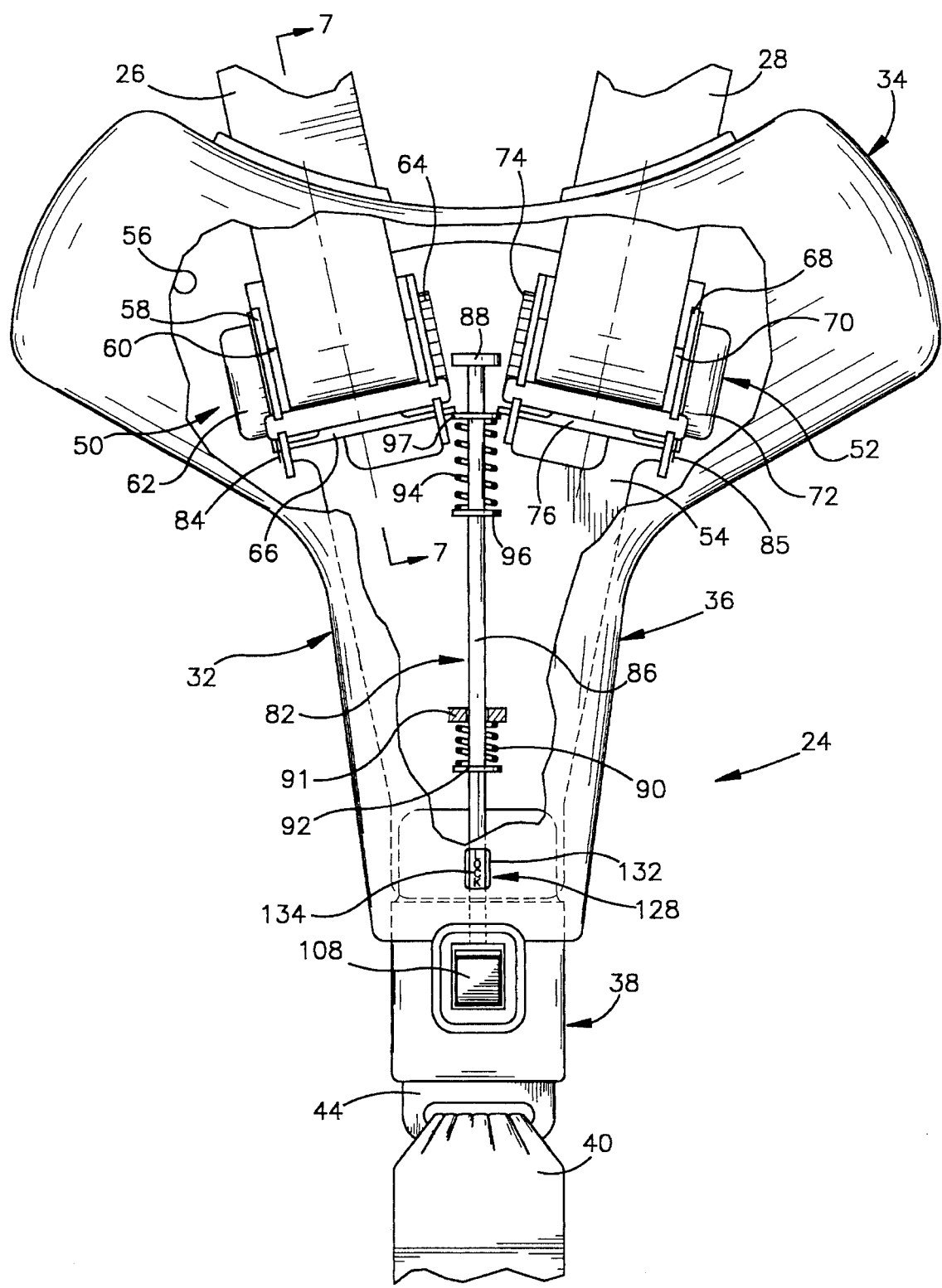
FIG. 3 is an enlarged and partially broken away view of a portion of the child restraint system.

An apparatus 10 (FIG. 1) for restraining a child 12 in a vehicle includes a child seat 14. The child's seat 14 is supported on a vehicle seat. The child's seat 14 has a base 16 upon which the child 12 sits. A back 20 extends upward from the base 16.

A restraining system 24 constructed in accordance with the present invention is connected with the seat 14. The restraining system 24 includes a shoulder belt 26 (FIG. 2) which engages the right shoulder of the child 12. The restraining system 24 also includes a shoulder belt 28 which engages the left shoulder of the child. Upper ends of the shoulder belts 26 and 28 are connected with the back 20 of the seat 14.

A padded abdomen shield 32 engages the abdomen of the child 12 (FIG. 1). The abdomen shield 32 includes a main section 34 (FIG. 2) which is connected with the shoulder belts 26 and 28 and extends across the abdomen of the child 12. A connector section 36 extends downward from the main section 34. The connector section 36 includes a buckle 38 fixedly connected to the connector section 38.

The buckle 38 receives a tongue 44 (FIG. 2). The tongue 44 is connected with an anchor strap 40 which is connected with the base 16. The buckle 38 includes parts to be described below for latching the tongue 44 to the buckle 38. When the tongue 44 is latched to the buckle 38, the abdomen shield 32 is connected to the base 16.

Figure 5:
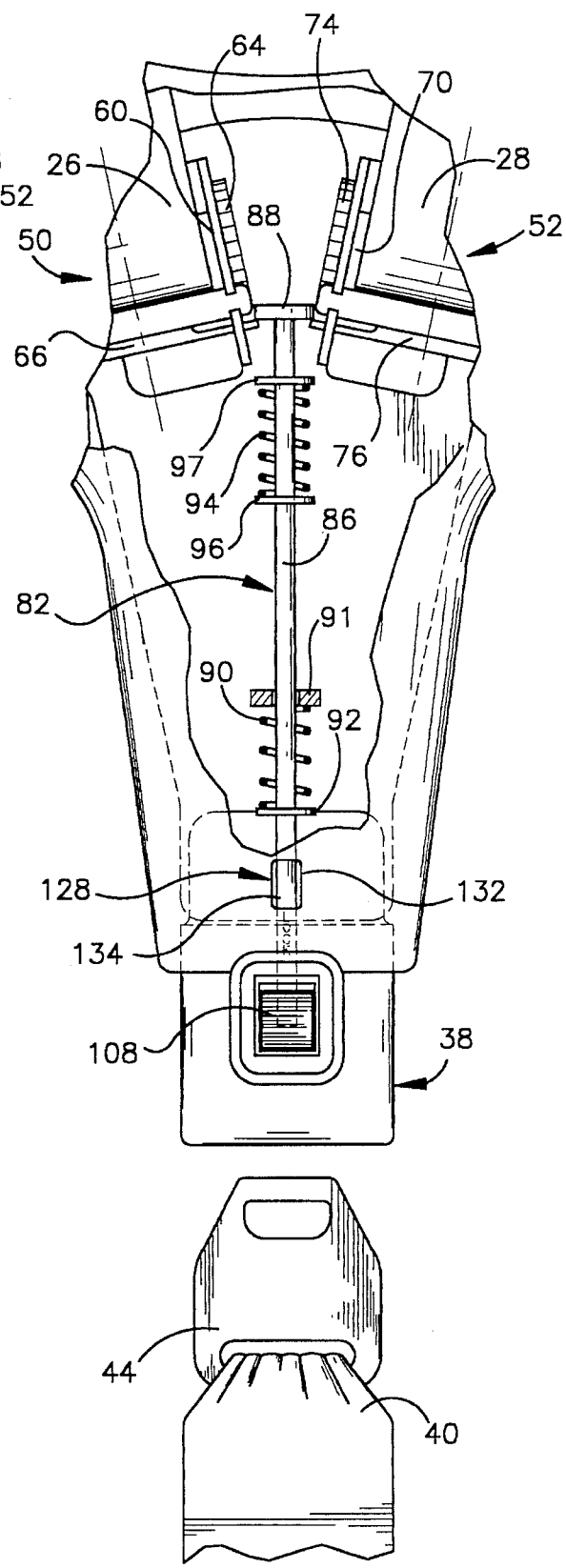
FIG. 5 is an enlarged fragmentary view similar to FIG. 4.
Figure 6:
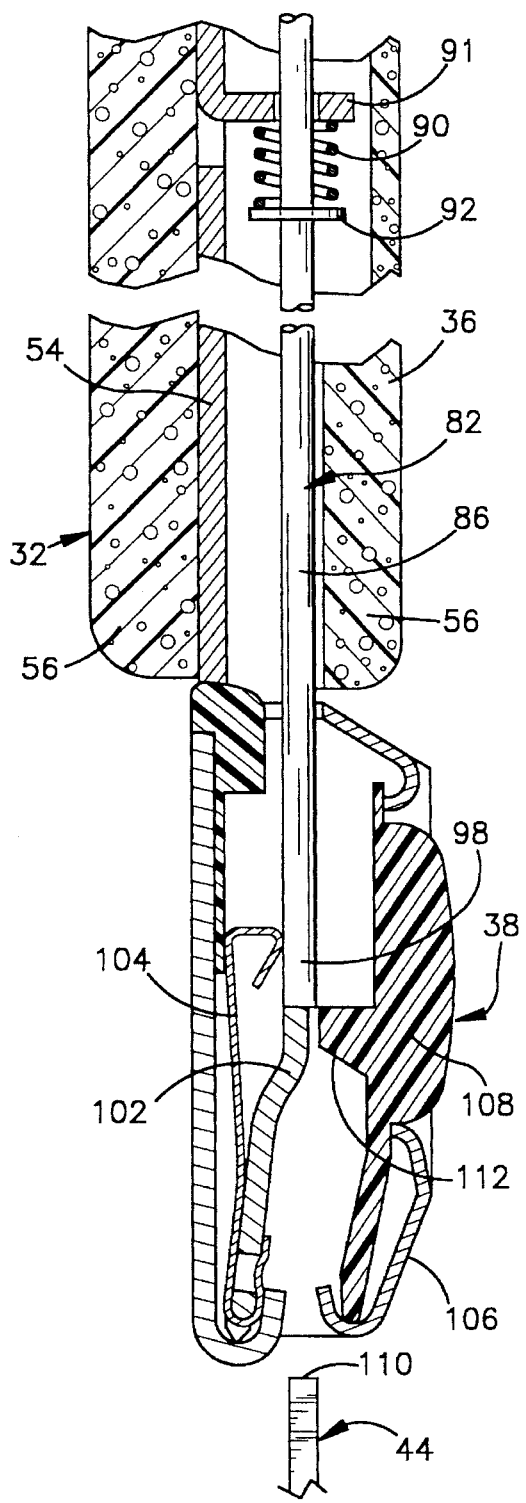
FIG. 6 is a sectional view illustrating the relationship of a buckle assembly to a tongue in the child restraint system, the buckle assembly and tongue being shown in a disengaged condition.

The buckle 38 includes a latch member 102 (FIG. 6) which is urged into the position shown in FIG. 6 by a latch spring 104. The latch spring 104 and latch member 102 are enclosed by a buckle housing 106. An opening (shown in FIG. 5) in the tongue 44 is engaged by the latch member 102 to hold the tongue in the buckle 38. A pushbutton 108 is manually depressed to depress the latch member 102 against the influence of latch spring 104 to release the tongue 44. Depressing the pushbutton 108 moves a projection 112 on the pushbutton into engagement with the latch member 102. As the pushbutton 108 is further depressed, the projection 112 moves the latch member 102 out of engagement with the opening in the tongue 44 to release the tongue.

A pair of retractor assemblies 50 and 52 (FIG. 3) are mounted in the abdomen shield 32. The retractor assemblies 50 and 52 are mounted in a spaced apart relationship on a metal base plate 54 of the abdomen shield 32. The base plate 54 and retractor assemblies 50 and 52 are enclosed by padding 56 (FIG. 6). The padding 56 is cut away in FIGS. 3, 4 and 5 to illustrate the retractor assemblies 50 and 52. The shoulder belt 26 is extendable from and retractable into the retractor assembly 50. The shoulder belt 28 is extendable from and retractable into the retractor assembly 52.

The retractor assembly 50 (FIG. 3) includes a frame 58 which is fixedly attached to the base plate 54 of the abdomen shield 32. A spool 60 is rotatably mounted in the frame 58. The shoulder belt 26 is attached to the spool 60 and may be wound on and unwound from spool 60. A spring assembly 62 is connected to the left (as viewed in FIG. 3) end of the frame 58. The spring assembly 62 includes a spiral coil spring having an inner end portion connected with the spool 60 and an outer end portion connected with the frame 58. The spiral coil spring biases the spool 60 in a belt winding direction.

A ratchet wheel 64 is fixedly connected with the right (as viewed in FIG. 3) end of the spool 60. A latch pawl 66 (FIGS. 3 and 5) is pivotally mounted on the frame 58 (FIG.

Figure 7:
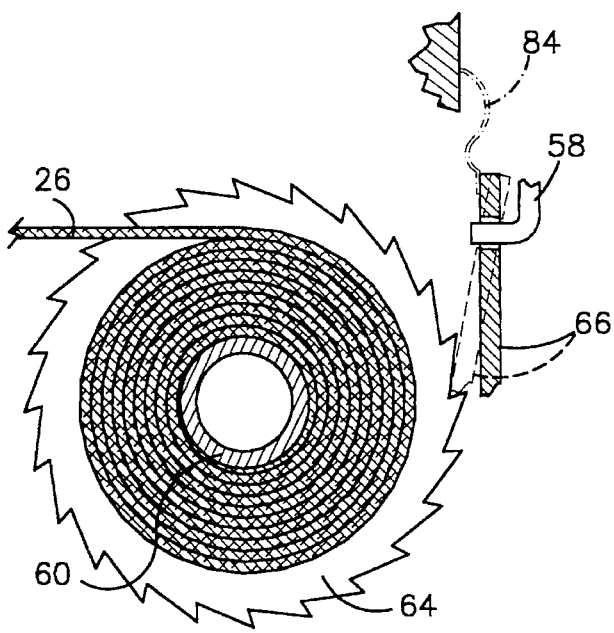
FIG. 7 is a schematic sectional view, taken generally along the line 7—7 of FIG. 3.

3). The latch pawl 66 is movable between a disengaged position, shown in solid lines in FIG. 7, in which the latch pawl is spaced from the ratchet wheel 64, and an engaged position, shown in dashed lines in FIG. 7, in which the latch pawl engages the ratchet wheel. When the latch pawl 66 is in the engaged position, the latch pawl blocks rotation of the spool 60 in a shoulder belt extending (unwinding) direction, that is, in a counterclockwise direction as viewed in FIG. 7.

The retractor assembly 52 (FIG. 3) has the same construction as the retractor assembly 50. Thus, the retractor assembly 52 includes a frame 68 fixedly attached to the base plate 54 of the abdomen shield 32 and upon which a spool 70 is rotatably mounted. A spring assembly 72 is mounted on the frame 68. The spring assembly 72 includes a spiral coil spring enclosed in a housing. An inner end portion of the spiral coil spring is connected with the spool 70 and an outer end portion of the coil spring is connected with the frame 68. The coil spring biases the spool 70 in a belt winding direction. The spools 60 and 70 are supported by the frames 58 and 68 for rotation about axes which are skewed relative to each other.

A ratchet wheel 74 is fixedly connected with an end of the spool 70 opposite from the coil spring assembly 72. A latch pawl 76 is movable between a disengaged position in which it is spaced from the ratchet wheel 74 and an engaged position in which the latch pawl engages the ratchet wheel. When the latch pawl 76 is in the engaged position, the latch pawl blocks rotation of the spool 70 in a direction in which the shoulder belt 28 is extended.

The latch pawls 66 and 76 engage the ratchet wheels 64 and 74 to prevent extension (unwinding) of the shoulder belts 26 and 28 in the same manner. Although it is preferred to prevent extension of the shoulder belts 26 and 28 by engaging the ratchet wheels 64 and 74 with the latch pawls 66 and 76, extension of the shoulder belts 26 and 28 could be prevented in a different manner if desired. For example, clamp assemblies could be provided to grip the shoulder belts 26 and 28.

An actuator assembly 82 (FIG. 3) is operable to move the latch pawls 66 and 76 from their disengaged positions to their engaged positions in response to connection of the buckle 38 with the tongue 44. Thus, prior to connection of the buckle 38 with the tongue 44, the latch pawls 66 and 76 are in their disengaged positions. When the latch pawls 66 and 76 are in their disengaged positions, the shoulder belt spools 60 and 70 are rotatable in either a clockwise or counterclockwise direction relative to the frames 58 and 68. Upon connection of the buckle 38 with the tongue 44, the actuator assembly 82 (FIG. 3) effects movement of the latch pawls 66 and 76 to their engaged positions.

The actuator assembly 82 includes a pair of latch pawl springs 84 and 85 (FIG. 3) which urge the latch pawls 66 and 76 toward their engaged positions. The latch pawl spring 84 is a wire spring. The latch pawl spring 85 has the same construction as the latch pawl spring 84. The latch pawl spring 84 is shown schematically in FIG. 7 in dot-dash lines biasing pawl 66 into the dashed line position shown in FIG. 7.

The actuator assembly 82 also includes a cylindrical actuator rod 86 (FIG. 3). The actuator rod 86 has a cylindrical head end portion 88 of a greater diameter than the remaining portion of the actuator rod 86. A lower end portion 98 of the actuator rod 86 is received in the buckle 38 (FIG. 6).

The actuator assembly 82 also includes a release spring 90. The release spring 90 has a helical configuration and encircles the actuator rod 86. The release spring 90 engages a portion 91 of the base plate 54 and a stop element 92 secured to the actuator rod 86. The release spring 90 is relatively strong, i.e., stronger than the latch pawl springs 84 and 85 together. The actuator rod 86 is urged axially downward into the buckle 38 (as viewed in FIGS. 3–5) by the release spring 90.

When a child 12 is to be positioned in the seat 14 (FIG. 1), the buckle assembly 38 is disengaged from the tongue 44. At this time, the actuator rod 86 is urged downward by the release spring 90 (FIG. 5). The head portion 88 of the actuator rod 86 engages the latch pawls 66 and 76 and the release spring 90 overcomes the latch pawl springs 84 and 85. Thus, the latch pawls 66 and 76 are held out of engagement with the ratchet wheels 64 and 74 by the head end portion 88 of the actuator rod 86. Therefore, the abdomen shield 32 can be readily moved away from the back 20 (FIG. 1) of the seat 14 to extend the shoulder belts 26 and 28 to facilitate positioning the child on the seat 14.

As the shoulder belts 26 and 28 are extended, the spools 60 and 70 are rotated relative to the frames 58 and 60 of the retractors and the shoulder belts are unwound from the spools. Once the child 12 has been positioned on the seat 14, the abdomen shield 32 is moved toward the back 20 of the seat and the abdomen of the child. As this occurs, the spring assemblies 62 and 72 rotate the spools 60 and 70 to retract the shoulder belts 26 and 28 by winding them onto the spools.

Figure 4:
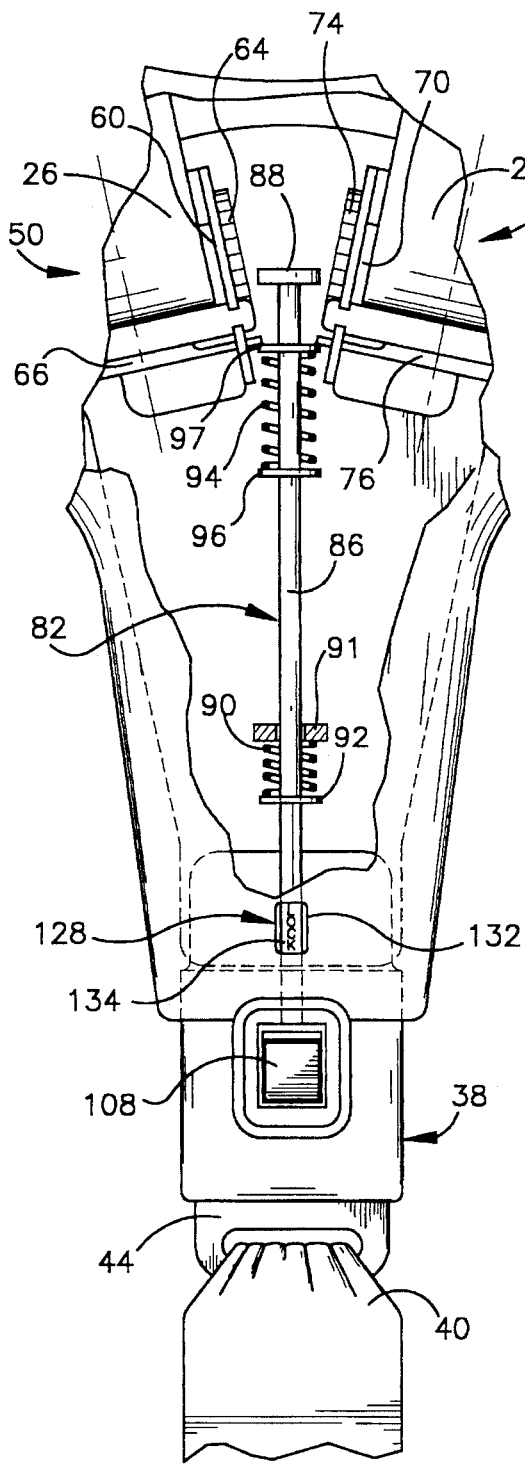
FIG. 4 is an enlarged fragmentary view of a portion of FIG. 3.

Once the abdomen shield 32 has been properly positioned relative to the abdomen of the child 12, the tongue 44 is inserted into the buckle 38 to connect the abdomen shield with the anchor strap 40 and base 16 of the seat 14. As the tongue 44 is inserted into the buckle 38, a leading end 110 (FIG. 6) of the tongue 44 moves the actuator rod 86 upward to move the head end portion 88 of the actuator rod out of engagement with the latch pawls 66 and 76 (FIGS. 3 and 4). This enables the latch pawl springs 84 and 85 to move latch pawls 66 and 76 into engagement with the ratchet wheels 64 and 74 to block further extension of the shoulder belts 26 and 28. However, the spools 60 and 70 can still be rotated by the spring assemblies 62 and 72 in a direction to retract the shoulder belts 26 and 28 by winding them onto the spools.

A backup lock spring 94 and a washer 97 encircle the actuator rod 86. The backup lock spring 94 has a helical configuration. The backup lock spring 94 is disposed between a stop 96 which is secured to the actuator rod 86 and the washer 97 which is slidable along the actuator rod 86. If the latch pawl springs 84 and 85 fail to move the latch pawls 66 and 76 into engagement with the ratchet wheels 64 and 74 as the tongue 44 is inserted into the buckle 38, the washer 97 will engage the latch pawls 66 and 76 and move the latch pawls into engagement with the ratchet wheels.

An indicator system 128 is provided to indicate when the latch pawls 66 and 76 are in their engaged positions blocking extension of the shoulder belts 26 and 28. The indicator system 128 includes an opening 132 (FIG. 3) formed in the connector section 36 of the abdomen shield 32. Indicia 134 is provided on the actuator rod 86. The indicia 134 is visible at the opening 132 when the actuator rod 86 has been moved upward (as viewed in FIGS. 3 and 4) by insertion of the tongue 44 into the buckle 38. As the tongue 44 is inserted into the buckle 38 and the actuator rod 86 is moved upward, the indicia 134 moves upward into a position in which it is visible at the opening 132. As this occurs, the latch member 102 moves into engagement with the opening in the tongue 44 to securely hold the tongue in the buckle 38. At this time, the indica 134 indicates that the tongue 44 and the buckle 38 have been interconnected.

As described above, when the pushbutton 108 is depressed, the tongue 44 is released from the latch member 102. The actuator rod 86 then moves downward (as viewed in FIG. 6) under the influence of release spring 90 to partially eject the tongue 44 (FIG. 4) from the housing 106. When the tongue 44 is removed from the buckle 38, the actuator rod 86 moves downward (as viewed in FIGS. 3–5) and the indica 134 is no longer visible at the opening 132.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for restraining a child seated in a vehicle, said apparatus comprising:

shoulder belts for engaging the shoulders of the child seated in the vehicle;

shield means for engaging the abdomen of the child seated in the vehicle; and shoulder belt retractor means mounted on said shield means and connected with said shoulder belts for enabling the shoulder belts to be extended upon movement of said shield means away from the abdomen of the child seated in the vehicle and for retracting the shoulder belts upon movement of said shield means toward the abdomen of the child seated in the vehicle;

said shoulder belt retractor means including a first rotatable spool upon which at least one of said shoulder belts is wound during retraction of said one shoulder belt and from which said one shoulder belt is unwound during extension of said one shoulder belt.

2. An apparatus as set forth in claim 1 wherein said shoulder belt retractor means includes a second rotatable spool upon which a second one of said shoulder belts is wound during retraction of said second shoulder belt and from which said second shoulder belt is unwound during extension of said second shoulder belt.

3. An apparatus as set forth in claim 2 wherein said retractor means includes a first latch member which is movable between an engaged condition in which said first latch member blocks rotation of said first spool and a disengaged condition in which said first latch member is ineffective to block rotation of said first spool and a second latch member which is movable between an engaged condition in which said second latch member blocks rotation of said second spool and a disengaged condition in which said second latch member is ineffective to block rotation of said second spool.

4. An apparatus as set forth in claim 3 further including a base, buckle means for interconnecting said shield means and said base, said buckle means being operable between a first condition connecting said shield means with said base and a second condition in which said buckle means is ineffective to connect said shield means with said base, and actuator means for moving said first and second latch members from the disengaged condition to the engaged condition upon operation of said buckle means from the second condition to the first condition.

5. An apparatus as set forth in claim 4 further including indicator means for indicating when said first and second latch members are in the engaged condition.

6. An apparatus as set forth in claim 2 wherein said first spool is rotatable about a first axis and said second spool is rotatable about a second axis which is skewed relative to said first axis.

7. An apparatus for restraining a child seated in a vehicle, said apparatus comprising:

a base;

shoulder belts connected with said base for engaging the shoulders of the child seated in the vehicle;

shield means for engaging the abdomen of the child seated in the vehicle;

retractor means mounted on said shield means and including a spool connected with said shoulder belts and being rotatable in a withdrawal direction for enabling the shoulder belts to be extended upon movement of said shield means away from the abdomen of the child seated in the vehicle and said Spool biased to rotate in a retraction direction for retracting said shoulder belts upon movement of said shield means toward the abdomen of the child seated in the vehicle;

belt restraining means mounted on said shield means and operable between an engaged condition preventing extension of said shoulder belts from said retractor means and a disengaged condition in which said belt restraining means is ineffective to prevent extension of said shoulder belts by said retractor means;

means for interconnecting said shield means and said base, said means including a buckle and a tongue latchable in said buckle to connect said shield means with said base; and actuator means for operating said belt restraining means from the disengaged condition to the engaged condition upon latching of said tongue in said buckle.

8. An apparatus as set forth in claim 7 further including indicator means for indicating when said tongue is latched in said buckle.

9. An apparatus as set forth in claim 7 wherein said shield means includes a main section in which said retractor means is mounted and a connector section which extends from said main section, said buckle being connected with said connector section of said shield means and said tongue being connected with said base.

10. An apparatus as set forth in claim 7 wherein said retractor means includes a first retractor assembly disposed in a first portion of said shield means and a second retractor assembly disposed in a second portion of said shield means, said actuator means being at least partially disposed between said first and second portions of said shield means.

11. An apparatus as set forth in claim 10 wherein said first retractor assembly includes a first spool around which a first one of said shoulder belts is wound during retraction of the first shoulder belt and from which said first shoulder belt is unwound during extension of the first shoulder belt, said second retractor assembly including a second spool around which a second one of said shoulder belts is wound during retraction of the second shoulder belt and from which the second shoulder belt is unwound during extension of the second shoulder belt.

12. An apparatus for restraining a child seated in a vehicle, said apparatus comprising:

first and second shoulder belts for engaging the shoulders of the child seated in the vehicle;

shield means for engaging the abdomen of the child seated in the vehicle; and shoulder belt retractor means mounted on said shield means and including a spool connected with said shoulder belts and being rotatable in a withdrawal direction for enabling the shoulder belts to be extended upon movement of said shield means away from the abdomen of the child seated in the vehicle and said spool biased to rotate in a retraction direction for retracting the shoulder belts upon movement of said shield means toward the abdomen of the child seated in the vehicle;

said retractor means including a first retractor assembly mounted in a first portion of said shield means, said first shoulder belt being retractable into and extendable from said first retractor assembly, and a second retractor assembly mounted in a second portion of said shield means and spaced from said first retractor assembly, said second shoulder belt being retractable into and extendable from said second retractor assembly.

13. An apparatus as set forth in claim 12 wherein said first retractor assembly includes a first means for effecting operation of said first retractor assembly to retract the first shoulder belt into said shield means, said second retractor assembly includes a second means for effecting operation of said second retractor assembly to retract the second shoulder belt into said shield means.

14. An apparatus as set forth in claim 12 wherein said first retractor assembly includes first belt restraining means operable between an engaged condition blocking extension of said first shoulder belt and a disengaged condition in which said first belt restraining means is ineffective to block extension of said first shoulder belt, said second retractor assembly including second belt restraining means operable between an engaged condition blocking extension of said first shoulder belt and a disengaged condition in which said second belt restraining means is ineffective to block extension of said second shoulder belt, a base, buckle means for interconnecting said shield means and said base, said buckle means being operable between a first condition connecting said shield means with said base and a second condition in which said buckle means is ineffective to connect said shield means with said base, and actuator means extending between said buckle means and said first and second belt restraining means for operating said first and second belt restraining means from the disengaged condition to the engaged condition upon operation of said buckle means from the second condition to the first condition.

\* \* \* \* \*